J. A. VAUGHN.
Grain Separator.
No. 1,120. Reissued Jan. 8, 1861.
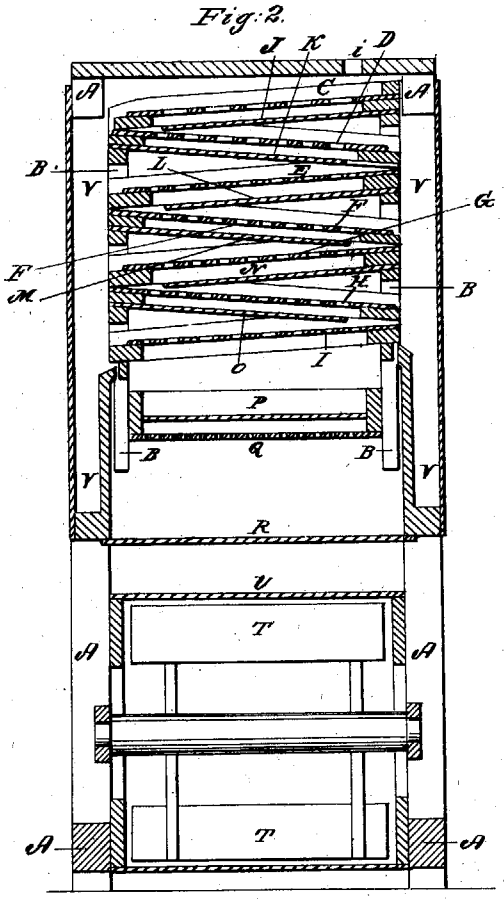
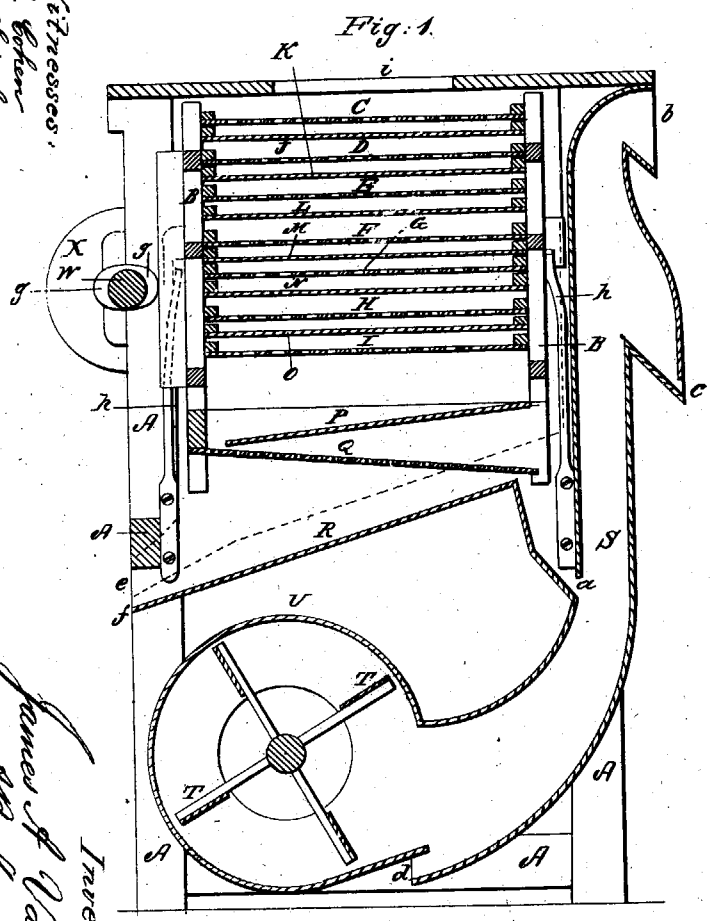
Witnesses:
E. Cohen
J. Hirsh.
Inventor:
James A. Vaughn
A.B. Houghton
N. PETERS, Photo-Lithographer, Washington, D. C.

UNITED STATES PATENT OFFICE.

JAMES A. VAUGHN, OF CAYAHOGA FALLS, OHIO.

IMPROVEMENT IN GRAIN-SEPARATORS.

Specification forming part of Letters Patent No. 28,026, dated April 24, 1860; Reissue No. 1,120, dated January 8, 1861.

*To all whom it may concern:*

Be it known that I, JAMES VAUGHN, of Cuyahoga Falls, in the county of Summit and State of Ohio, have invented certain new and useful Improvements in Grain-Separators; and I do hereby declare the following to be a full, clear, and exact description of the same, reference being had to the accompanying drawings, making a part of this specification, in which—

Figure 1 represents a longitudinal vertical section through a grain cleaning and separating machine after my plan. Fig. 2 represents a vertical cross-section through the same.

Similar letters of reference, where they occur in the separate drawings, denote like parts in both of the figures.

In the separation of grain from impurities gathered with it zigzag screens have been used in connection with a shake motion and a blast, several instances of which may be found in the records of the Patent Office. Boxes have also been connected heretofore to shaking screens to catch the grain, such as oats and other material that passes over the screens. The difficulty in connecting these boxes with the screens is this, that the boxes become loaded with grain, and as this load has to be shaken with the screens it requires much power, and is a drag upon the power required to give motion to the screens, impeding their free and easy vibration. I am also aware that a series of long zigzag screens and a long fan have been arranged in a frame to make a grain-separator. These are very objectionable, first, because the screens are difficult of access, liable to clog, and must be often cleaned to be at all efficient; and, second, as to a long fan, it cannot be made to produce a uniform blast throughout the wind-trunk, because the air must be drawn into the fan-case at the ends only and none at the center. The consequence is that there is a sharp blast at the ends and comparatively no blast in the middle of the wind-trunk. These imperfections make such a grain-separator of comparatively little or no practical value, and my object and aim has been to overcome these objectionable features, which I have effectually done, as I will hereinafter explain.

The nature of my invention consists, first, in combining a series of zigzag screens and directing-boards that have a shake motion communicated to them with stationary chambers to receive the material that passes over said screens for the purpose of avoiding the load and drag that is upon such screens when they have the chambers or boxes united with them; and, second, in combining with a series of zigzag screens and directing-boards that have a shake motion communicated to them the stationary receiving-chambers and a short fan; and, third, the combination of a directing-board, cockle-riddle, and cockle-board, the objects of which will be explained.

To enable others skilled in the art to make and use my invention, I will proceed to describe the same with reference to the drawings.

A represents the main frame of the separator, in which I arrange a second frame, B, that carries a series of zigzag riddles, C D E F G H I, and underneath them a series of directing-boards, J K L M N O. These riddles and directing-boards incline across or the narrow way of the machine, which admits of their being easily cleansed from one end or side without being incommoded by the blast-trunk, as is the case when arranged lengthwise of the frame.

P is a directing-board underneath the series of screens and their boards, which carries the grain to the extreme end of what I term the "cockle-screen" Q, as it is perforated to allow cockle or impurities of about its size to pass through it onto a cockle-board, R, which directs it out of the machine, while the grain from which it has just been separated passes into the blast-trunk S at *a*, and is acted upon by the blast from the fan T.

The fan-case U is arranged across the machine, so as to contain a short fan, and is consequently more evenly supplied with air than if arranged lengthwise of the frame. The wind trunk S, being narrow, too, affords an uniform blast, which a wide one would not afford, for reasons above stated. The lighter impurities are blown out at *b*, the light grain at *c*, and the full or heavy grains at *d*. The oats, sticks, and other impurities that pass over the screens drop into the chambers V V, which are stationary, and not connected with the screens or screen-frame, and pass out at *e*, as represented by dotted lines in Fig. 1, at the sides of the machine, and the cockle runs off at *f*, each delivery for each specific separation of the several grains, seeds, or impurities being separated from the others.

W is a shaft, to which the power that operates the separator may be applied. It has upon it a pulley, X, over which a belt may pass to drive the fan, said belt passing around a pulley on the fan-shaft for this purpose. On the shaft W there is a cam, *g*, for vibrating the screen-frame B with its series of screens and boards, said screen frame being held up against the cam by means of the springs *h*, to which it is connected. The vibration which the screen-frame may receive from a cam without producing an actual jarring motion may be very great, and is peculiarly adapted to the separation of oats from wheat. It is obvious that oats will readily pass through a screen that wheat will pass through, provided the oats goes point foremost into the perforations, and a jarring motion, like that produced by a crank, will so turn the oats into the openings in the screen, and allow it to go through with the wheat. So much so is this the case that two hundred or two hundred and fifty vibrations of the screens by a crank is the limit that will admit of the oats passing over without turning and going through the screen, while with a cam motion I can run my screens to four hundred and four hundred and fifty vibrations, and correspondingly increase the capacity of the machine, as it is of course limited only by the quantity of grain that can be passed over the screens.

These changes which I have affected in this class of machines have given it an importance and value not heretofore known. The long screens, and the long fan, and the wide-trunk, and the shaking grain-boxes, and the crank-motion were all objectionable. I have dispensed with them all, and have made an entire different reorganization, by which an imperfect machine has become one of the most valuable ones connected with the cleaning and separating of grains from the grosser seeds, filth, or impurities.

The grain is fed into a hopper that stands over an opening, *i*, in the top of the machine, and passes over and through the series of screens and boards, each passage over each screen taking out the oats, sticks, &c., while the wheat with some finer impurities pass from directing-board to screen, and from screen to directing-board, until the finer impurities pass through the screen Q, and the wheat passes into the blast-trunk, where it is cleaned and further separated from lighter grains.

The heavy wheat, the lighter wheat, the dirt, chaff, or filth, the cockle and the oats all have their separate exits though all fed in at the same place. The separation is perfect and expeditious, and the machine easily kept clean, requiring but little power to operate it, is cheap, durable, and very efficient.

Having thus fully described the nature and object of my invention, what I claim therein as new, and desire to secure by Letters Patent, is—

1. In combination with a series of zigzag screens and directing-boards having a shake motion, the stationary chambers for receiving the material therefrom, substantially as herein described.

2. The combination of the series of zigzag screens and directing-boards having a shake motion, the stationary receiving-chambers, and short fan, when arranged to operate substantially as herein described.

3. The combination of the directing-board P, cockle-riddle Q, and cockle-board R, substantially as and for the purpose herein described.

JAMES A. VAUGHN.

Witnesses:
P. G. SOMERS,
G. PARKS.